No. 624,445. Patented May 9, 1899.
G. W. BENNUM.
COMBINATION GLASSES.
(Application filed Feb. 3, 1898.)

(No Model.)

Witnesses:
H. B. Hallock.
R. M. Pierce.

Inventor.
George W. Bennum.
by J. J. Williamson
Attorney.

THE NORRIS PETERS CO., PHOTO-LITHO., WASHINGTON, D. C.

United States Patent Office.

GEORGE W. BENNUM, OF GEORGETOWN, DELAWARE.

COMBINATION-GLASSES.

SPECIFICATION forming part of Letters Patent No. 624,445, dated May 9, 1899.

Application filed February 3, 1898. Serial No. 668,942. (No model.)

*To all whom it may concern:*

Be it known that I, GEORGE W. BENNUM, a citizen of the United States, residing at Georgetown, in the county of Sussex and State of Delaware, have invented a certain new and useful Improvement in Combination-Glasses, of which the following is a specification.

My invention relates to a new and useful improvement in bifocal spectacles, and has for its object to provide an exceedingly simple and effective arrangement for utilizing two pairs of lenses and for carrying one pair in or out of action, as occasion may require. While many attempts have been made to accomplish this result, there has always been more or less difficulty in utilizing the various constructions in practice; but by my invention I have overcome these difficulties which have heretofore been experienced and provided a simple means for attaching the second pair of lenses to the primary pair of spectacle-frames and providing for the holding of said secondary lenses in or out of action without interfering with the use of the spectacles proper.

In order that those skilled in the art to which this invention appertains may understand how to make and use the same, the construction and operation will now be described in detail, referring to the accompanying drawings, forming a part of this specification, in which—

Figure 1:
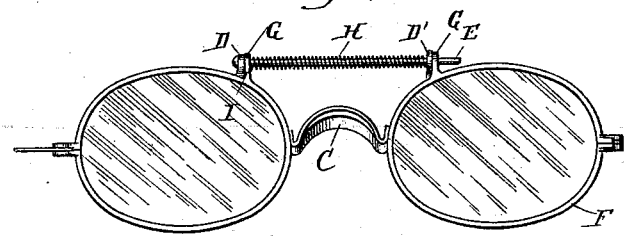
Figure 2:
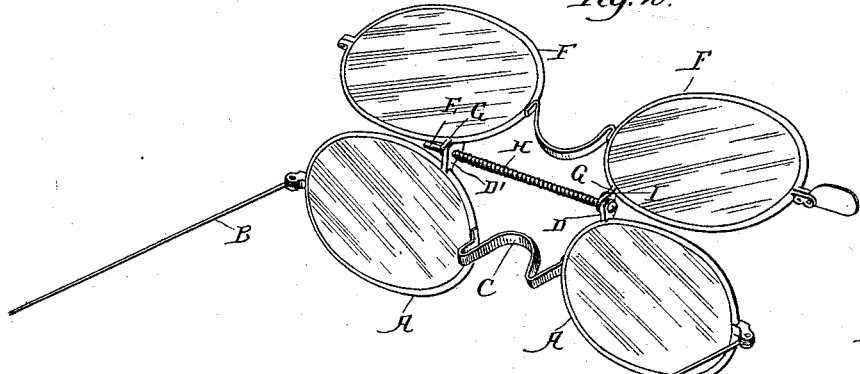
Figure 4:
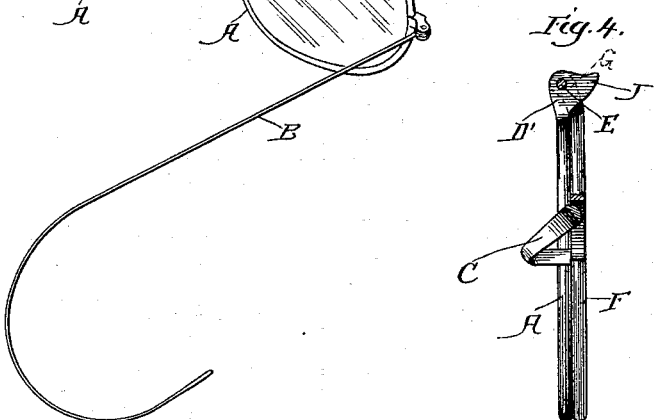
Figure 3:
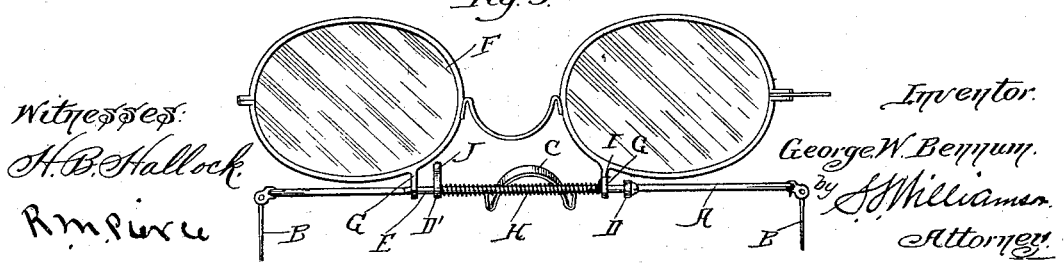

Figure 1 is a front view of a pair of spectacles made in accordance with my improvement; Fig. 2, a perspective showing the secondary lenses swung out of active position; Fig. 3, an edge view of the spectacles proper, showing the secondary lenses in the position illustrated in Fig. 2, but after they have been unlatched and ready for moving downward into activity; and Fig. 4, an enlarged section through the nose-piece of a pair of spectacles, showing the secondary lenses closed and clearly illustrating the latch for holding these secondary lenses open.

In carrying out my invention as here embodied, A represents the frame of the spectacles, having the usual temples B and nose-piece or bridge C. Formed with or secured to the rims of this frame are lugs D and D', in which is secured the pintle-rod E in any suitable manner, and this rod serves to hinge the secondary frame F to the primary frame by means of the lugs G, formed upon the former and through which the pintle-rod passes. This arrangement permits the secondary frames to freely swing upon the pintle-rod and also have a sliding movement thereon, the object of which will be hereinafter set forth.

A spring H is coiled about the pintle-rod and confined between the lugs D' and G in such manner as to hold the latter against the lug D with a limited amount of pressure, and thus prevent the secondary frame from becoming displaced from the pintle-rod. One end of this spring engages with the lug G, as indicated at I, while the opposite end thereof engages with the lug D', so that the axial tension of the spring will be utilized to normally hold the secondary frame in its closed position, which brings the lenses carried thereby into activity. A latch J is formed with the lug D' and so shaped that when the secondary frame is swung upward one of the rims thereof will cam against the under side of this latch and give the secondary frame a slight longitudinal movement upon the pintle-rod, the result of which is that when the frame has reached the proper height the spring will reverse the longitudinal movement and bring the rim into engagement with the upper side of the latch, and thus hold the frame in its elevated position. When the secondary frame is thus held, it is obvious that it will there remain, elevating the primary lenses in their normal condition for one class of observation; but when it is desired to compound the lenses this is readily accomplished by forcing the secondary frame slightly sidewise until the rim thereof passes out of engagement with the latch, when the spring H, as already described, will return the secondary lenses to their active position, after which all observation will take place through both pairs of lenses. From this description it is to be noted that the spring H serves the twofold purpose of actuating the secondary frame in its swinging movement and also in its longitudinal movement.

Of course I do not wish to limit myself to the combination of lenses, as the primary lenses may be used either for long or short distance observation, and when the secondary lenses are brought into action the reversed result will be had.

A very important feature of my improvement is the fact that the full surface of the lenses is utilized in both classes of observation and that when the lenses are compounded the secondary pair are brought and held in true relation to the primary pair, since the secondary frames are brought in positive and firm contact with the primary frames and there held at all times.

Having thus fully described my invention, what I claim as new and useful is—

1. In combination, a primary spectacle-frame having lugs, a secondary frame having lugs, a latch formed with one of the lugs of the primary frame for engaging the secondary frame, a pintle-rod arranged in the lugs of the primary frame on which the secondary frame is swingingly mounted, and a spring encircling the rod for pressing the secondary frame and latch into engagement, substantially as described.

2. In a device of the character described, a primary frame having apertured lugs, a latch formed with one of the lugs, a pintle-rod arranged in apertures of the lugs, a secondary frame having lugs swingingly mounted on the pintle-rod and arranged to move longitudinally of the pintle-rod, a spring encircling the rod and normally holding the lugs of the secondary frame in engagement with the lugs of the primary frame, as and for the purpose described.

In testimony whereof I have hereunto affixed my signature in the presence of two subscribing witnesses.

GEORGE W. BENNUM.

Witnesses:
GEO. McCURDY,
DAVID V. CHADWICK.